3,157,513
ENZYMATIC TREATMENT OF CEREAL GRAINS
Winston F. Allen and Joseph J. Thompson, both of Battle Creek, Mich., assignors to Kellogg Company, Battle Creek, Mich., a corporation of Delaware
No Drawing. Filed Nov. 15, 1961, Ser. No. 152,675
7 Claims. (Cl. 99—17)

This invention relates to the production of a novel food composition derived from cereal grains or cereal grain components.

More particularly, the present invention relates to the enzymatic treatment of cereal grains such as wheat, barley, corn, or oats, etc., or flour derived from such cereal grains in a manner whereby an aqueous liquid material is derived therefrom which contains soluble and colloidal partially digested proteins constituting a major amount of the protein present in the raw grain or flour.

The invention further relates to the conversion of a minor portion of the starch content of the aforesaid cereal grain material to sugars, so that the protein liquid material hereinbefore described has a pleasant aroma and taste so that it may be moderately sweet, smooth in texture, and all free from granular and gummy precipitates after standing.

The present invention further relates to the production of food products containing the aforesaid high protein content material in either liquid or dry form.

It is therefore an object of the present invention to provide a novel process for the obtaining of protein materials from cereal grains in an economical manner and in high yield, which protein material can include as a result of the process minor amounts of starch-derived sugars, suitable for use in the production of high protein beverages and in the production of formulations of food products such as soups, salad dressing, custards, etc.

The liquid product of the present invention or the dry residue thereof supplies proteins and carbohydrates as well as water soluble minerals and some of the vitamins in the cereal grain material processed.

In carrying out the process of the present invention, grain material in finely divided condition is digested, in the form of an aqueous slurry, first with a proteolytic enzyme so as to convert in excess of 50% of the protein content of the cereal grain treated to soluble and colloidal partially digested proteins. From this liquid phase the bran and starch residue solids are readily separated, and the high protein content liquid recovered as a product of the process. The proteins in this digested liquid constitute from about 70 up to about 90% of the protein content of the raw grain or flour treated. The liquid is then heated to inactivate the enzyme content.

In the aforesaid process, an upper sludge layer is separated from the recovered granular starch, which sludge layer contains some protein and starch material. This sludge layer can then be subjected to gelatinization by heat and then digested in the presence of amylolytic enzyme in aqueous solution to convert the starch content to sugars, following which the solution is heated to inactivate its enzyme content. If desired, this step of treating the sludge separated from the starch fraction can be simultaneously treated with added proteolytic enzyme so as to further solubilize and convert any protein content thereof.

As another alternative, the sludge layer separated from the starch fraction can be mixed with the digested protein-containing liquid prior to heating and the mixture then heated to gelatinize starch content, following which it is then treated with amylolytic enzyme to convert the gelatinized starch content to sugars and then subjected to heat treatment to inactivate all enzyme content.

It will thus be apparent that the present process comprises an economical treatment of grain since there is no need for loss of constituents down the drain or to be disposed of for livestock feed, the recovered starch and bran being useful, and the starch wash water being susceptible to being fed back to the beginning of the process.

The recovered digested liquid containing the soluble and colloidal solids may be used directly in food products, or spray dried or vacuum dried before adding to other food ingredients without resulting in a sandy or coarse texture and without settling out and clogging the processing equipment.

The recovered protein material is bland in taste as well as smooth in texture, and hence can be used in a wide variety of food and flavors and in the formulation of different food products where more easily digested protein as well as maltose and dextrose sugars enhance the food product. The recovered liquid material can be used in instant high protein food beverages, and aid in promoting smoothness and in giving a stable, creamy texture to the drink and to supply said drink, with, for example, from about 30 to about 60% of its protein content.

The following is an example of the preparation of a high protein enzyme digested liquid from wheat flour in accordance with one specific embodiment of the present invention:

*Example I*

(1) Two liters of water heated to a temperature of 95° F. and having a pH of 9.73 resulting from addition thereto of calcium hydroxide was put into a one-gallon size Waring Blendor. (In lieu of the calcium hydroxide other substances such as sodium hydroxide, carbonate or bicarbonate, may be added as well as calcium hydroxide or oxide and the like basic substances to provide a pH during the process of from about 6 to about 10.) While running this comminuting and mixing device at a low speed, one kilogram of second clear grade hard wheat flour (containing 10.9% moisture, 15.3% protein) was slowly added. The resulting slurry was homogenized in the blending device at slow speed for about 2 minutes, at which time the pH was reduced to 6.18 and the temperature became elevated to 134° F.

(2) The slurry from the foregoing step was allowed to stand for about 18 minutes at a temperature of 130–134° F. and the pH adjusted to 6.63 by adding 1.0 gram of dry calcium hydroxide to the slurry while slowly homogenizing.

(3) The foregoing slurry was cooled to 120° F. at which time 0.50 gram (0.05%) of proteolytic enzyme (Takamine #HT proteolytic 200, *Bacillus subtilis* proteinase) was added after dissolving in 2 to 3 ml. of water. Digestion was continued for 4 hours at 125° ±1° F. with constant stirring.

(4) The foregoing partially digested slurry was immediately centrifuged to separate and recover the starch and bran from the supernatant liquid containing the digested protein.

(5) The supernatant protein liquid separated in step 4 was centrifuged again. The sludge thrown down was put into a 1-liter stainless steel beaker and the separated digested protein liquid recovered.

(6) The foregoing digested liquid (hereinafter designated as liquid A) was then heated slowly to the boiling point with constant stirring and continued for 5 minutes to inactivate the enzyme and destroy the raw wheat flavor and recovered as a product of the process.

(7) Bran was removed from the separated starch by suspending the mixture recovered in step 4 in 600 ml. of cold tap water and then putting through a #230 U.S.S. screen on a vibrator. Bran remaining on the screen was washed with 6 small portions of tap water from a wash bottle.

(8) Starch slurry with bran wash water passing through screen was centrifuged.

(9) The top sludge layer on the granular starch fraction was carefully removed and added to that sludge in the beaker (step 5). About 300 ml. of starch wash liquid was also put into this beaker.

(10) The washed and separated bran and starch recovered respectively from steps 7 and 8 were air dried on stainless steel trays, and then dried for about 2 hours at 200 to 212° F. before being weighed and analyzed.

(11) Starch content in the sludge or mixture fraction (step 9) was gelatinized by heating slowly to 159° F. with constant stirring.

(12) Then 0.10 gram of amylolytic enzyme (Takamine #HT–440, *Bacillus subtilis* amylase) was added (in solution). The mixture was digested, stirring continuously, for 80 minutes at 158 to 160° F.

(13) It was then cooled to 135° F. and 0.02 gram of Takamine HT proteolytic 200 enzyme was added (in solution). The digestion was continued for 3 hours at 125 to 130° F.

(14) Temperature was then increased to 170° F. and held for 15 minutes. Heat was increased over a 30-minute period to 212° F. to inactivate the enzymes and destroy the raw wheat flavor. This fraction was designated as "digested liquid B."

*Yields and Analyses*

| Constituent | Yield, grams | Mois., percent | Protein (N×5.7), grams in constituents | Reducing Sugars, percent D.E. | pH |
|---|---|---|---|---|---|
| Bran | 33.0 | 3.06 | 1.80 | | |
| Starch | 291.5 | 6.20 | 6.21 | | |
| Digested Liquid A | 2,134.2 | 80.81 | 111.83 | 5.51 | 6.53 |
| Digested Liquid B | 564.0 | 72.63 | 28.76 | 7.47 | 6.39 |
| Starch Wash Liquid (Remaining) | 410.0 | | 3.03 | | 6.97 |
| Total | | | 151.63 | | |

Nitrogen recovered in digested liquids A and B=91.89%.*
Nitrogen recovered in all constituents=99.10%.*

(*Total protein (N×5.7) in flour used was 153.0 grams.)

The following is an example of the preparation of a high protein enzyme digested liquid from whole wheat:

*Example II*

(1) One kilogram of unground soft white winter wheat (moisture 11.48%, protein 9.47%) was put into a 2-liter beaker and washed with 500 ml. of cold tap water. Water was drained off immediately and the wheat was covered and allowed to temper about 30 minutes.

(2) Two liters of calcium hydroxide treated hot water (pH 10.06, temperature 95° F.) were put into the large (1 gallon) Waring Blendor. The washed wheat was added slowly to the water in the blender while running at slow speed. After all the wheat had been added, the blender was run at high speed for 2 minutes to shear and finely subdivide the wheat and to form a slurry thereof with the water. The pH of slurry was 6.40 and the temperature was 106° F.

(3) The pH of the slurry was adjusted to 7.25 by slowly adding 1.024 grams of dry $Ca(OH)_2$ while running the blender at slow speed. The slurry was then homogenized at high speed for about 3 minutes until a temperature of 125° F. was reached.

(4) Immediately 0.50 gram of proteolytic enzyme dissolved in water, as in Example I, was added and the slurry (pH 6.75) was digested for 2 hours and 15 minutes at 126 to 131° F. with constant stirring. More $Ca(OH)_2$ (0.334 gram) was added during the digestion to raise the pH to 6.81.

(5) Bran was removed from the digested slurry by putting the liquid through a #230 U.S.S. screen on a vibrator in 4 portions, and washing it thereon with warm (110°–120° F.) tap water.

(6) Granular starch was separated from the above filtrate slurry by centrifugation. The supernatant digested liquid, and a top sludge layer, further separated from the starch, were put into a 4-liter stainless steel beaker.

(7) Starch was washed once by suspending in about 1 liter of distilled water and then centrifuging again. The top sludge layer on the starch was again scraped off and added to the main portion in the 4-liter beaker (step 6).

(8) The 4-liter beaker and contents were heated in a salt water bath with constant stirring to 160° F. to gelatinize the starch content. pH of mixture was 6.90.

(9) Liquid was cooled to 150° F. and 0.30 gram of Takamine HT–440 amylolytic enzyme (*Bacillus subtilis* amylase) added (in solution). Digestion was continued for 2 hours at 146 to 154° F. with constant stirring.

(10) The temperature was then gradually increased to 207° F. over a 1 hour and 45 minute period to inactivate the enzyme and destroy the raw wheat taste.

(11) Digested liquid was cooled, weighed, and sample taken for analyses. The separated and washed bran and starch were air dried on stainless steel trays, then dried for about 2 hours at 200 to 212° F. before being weighed and analyzed.

*Yields and Analyses*

| Constituent | Yield, grams | Moisture, percent | Protein (N×5.7), grams in constituents | pH |
|---|---|---|---|---|
| Bran | 133.3 | 3.95 | 14.84 | |
| Starch | 458.3 | 3.25 | 3.67 | |
| Digested Liquid | 1,993.3 | 92.18 | 69.37 | 6.66 |
| Starch Wash Liquid | 710.0 | 97.35 | 4.08 | 6.90 |
| Total | | | 91.96 | |

Nitrogen recovered in digested liquid=73.25%.*
Nitrogen recovered in all constituents=97.11%.*

(*Total protein (N×5.7) in wheat used was 94.7 grams.)

Several experiments were conducted with wheat flour using the same general procedure described in Example II above (omitting step 1). The removal of bran on the #230 screen was considerably easier with whole wheat because of the larger size of the bran particles. The addition of a proteolytic enzyme for the second or starch sludge digestion period (as in Example I) is recommended for obtaining higher digested protein in the liquid.

The following is an example of a formulation for an instant high protein beverage containing enzyme digested liquid from wheat, the formula being plain and without flavor:

*Example III*

| Ingredients | Weight percent | Grams per batch |
|---|---|---|
| Non-fat Milk Solids | 40.00 | 80.00 |
| Brewers Yeast | 1.00 | 2.00 |
| Digested Liquid A (Example I) | ¹ 37.11 | 386.76 |
| Digested Liquid B (Example I) | ¹ 14.39 | 105.14 |
| L-Lysine-HCl | 1.00 | 2.00 |
| Corn Oil | 5.00 | 10.00 |
| Wheat Germ Oil | 1.00 | 2.00 |
| Sodium Alginate | 0.40 | 0.80 |
| Ascorbic Acid | 0.10 | 0.20 |
| Total | 100.00 | 588.90 |

¹ Moisture-free basis.

The foregoing are mixed and a drink prepared therefrom as follows:

(1) The digested liquids A and B were weighed directly in the small Waring Blendor bowl. Then all dry ingredients were added to the liquid and homogenized at high speed for about 30 seconds. The oils were then added while homogenizing at high speed.

(2) An 8-ounce drink was prepared by weighing out 167 grams (56.7 grams or 2 ounces on a dry basis) of the emulsified mix and then adding 0.12 ml. of vanilla extract. The mix was diluted with 69.6 grams of cold water to make 8 ounces and homogenized for about 30 seconds. A second drink was prepared successfully by merely stirring rapidly with a spoon. This food beverage had a very smooth creamy consistency and color, resembling egg nog. It did not have any "grainy" or "sandy" feel in the mouth and the emulsion was stable for at least 30 minutes. The taste was bland, with no objectional aftertaste. Several flavors could be used with this formula including vanilla, butterscotch, maple nut, egg nog, etc. A chocolate drink would require a modified formula.

Analysis of beverage before dilution:

Total solids_____ 34.43%.
Protein (N×6.25)_____ 10.38% or 30.15% on moisture free basis.
pH_____ 6.29.

We claim:

1. The method for the preparation of high protein, enzyme-digested liquid from cereals which comprises digesting an initially alkaline aqueous slurry of finely subdivided raw cereal grain with proteolytic enzyme, and separating and recovering a liquid containing a major amount by weight of the protein content of said cereal grain in the form of soluble and colloidal partially digested proteins from unconverted granular starch content, and thereafter heating said liquid to inactivate its enzyme content.

2. The method of claim 1 where the raw cereal grain is whole wheat.

3. The method of claim 1 where the raw cereal grain is wheat flour.

4. The method for the preparation of high protein, enzyme-digested liquid from cereals which comprises homogenizing finely subdivided raw cereal grain with alkaline water to form an initially alkaline slurry, digesting said slurry with proteolytic enzyme until the major amount by weight of the protein content of said cereal grain material becomes partially digested and in part solubilized and dissolved, and in part colloidally dispersed, in the aqueous medium, separating therefrom substantially all granular starch and bran content, and thereafter heating the protein-containing liquid to inactivate the enzyme content.

5. A method for the preparation of high protein, enzyme-digested liquid from cereals which comprises homogenizing finely subdivided raw cereal grain with alkaline water to form an initially alkaline slurry, digesting said slurry with proteolytic enzyme until the major amount by weight of the protein content of said cereal grain material becomes partially digested and in part solubilized and dissolved, and in part colloidally dispersed, in the aqueous medium, separating therefrom substantially all granular starch and bran content, thereafter heating the protein-containing liquid to inactivate the enzyme content, separating a top starch-containing sludge layer from said separated starch, gelatinizing the latter, then digesting it with the amylolytic enzyme in aqueous solution to convert it to sugars, and thereafter heating to inactivate the enzyme content.

6. The process of claim 5 where the digestion of the starch sludge is conducted in the added presence of proteolytic enzyme.

7. A method for the preparation of high protein, enzyme-digested liquid from cereals which comprises homogenizing finely subdivided raw cereal grain with alkaline water to form an initially alkaline slurry, digesting said slurry with proteolytic enzyme until the major amount by weight of the protein content of said cereal grain material becomes partially digested and in part solubilized and dissolved, and in part colloidally dispersed, in the aqueous medium, separating therefrom substantially all granular starch and bran content, separating a top starch-containing sludge layer from said separated sludge, adding said starch sludge to said digested protein-containing liquid, heating the resulting mixture to gelatinize the starch content, then digesting it with amylolytic enzyme to convert the gelatinized starch to sugars, and thereafter heating said digested-material-containing liquid to inactivate its enzyme content.

References Cited in the file of this patent

UNITED STATES PATENTS

| | | |
|---|---|---|
| 1,237,724 | Steinemann | Aug. 21, 1917 |
| 1,350,756 | Wahl | Aug. 24, 1920 |
| 1,541,263 | Hoffman et al. | June 9, 1925 |
| 1,829,762 | Schneider et al. | Nov. 3, 1931 |
| 2,141,455 | Weizman | Dec. 27, 1938 |
| 2,676,888 | Westfall | Apr. 27, 1954 |